United States Patent [19]

Tulowiecki et al.

[11] 4,324,358

[45] Apr. 13, 1982

[54] MINIMUM AIRFLOW CONTROL

[75] Inventors: David Tulowiecki, Liverpool; Richard R. Lavassaur, Oneida, both of N.Y.

[73] Assignee: Carrier Corporation, Syracuse, N.Y.

[21] Appl. No.: 165,456

[22] Filed: Jul. 2, 1980

[51] Int. Cl.³ .............................................. F24F 7/06
[52] U.S. Cl. ..................................... 236/49; 236/80 R
[58] Field of Search .......................... 236/49, 87, 80 R

[56] References Cited

U.S. PATENT DOCUMENTS

| | | | |
|---|---|---|---|
| 3,434,409 | 3/1969 | Fragnito | 98/41 |
| 3,554,112 | 1/1971 | Herb | 98/40 |
| 3,595,475 | 7/1971 | Morton | 236/93 |
| 3,653,588 | 4/1972 | Dreibeus | 236/49 |
| 3,727,835 | 4/1973 | Rifkin | 236/49 |
| 3,806,027 | 4/1974 | Ginn et al. | 137/84 X |
| 3,937,398 | 2/1976 | Waeldner et al. | 236/38 |
| 3,961,748 | 6/1976 | McNabney | 236/49 |
| 4,019,566 | 4/1977 | Cobb | 165/2 |
| 4,077,567 | 3/1978 | Ginn et al. | 236/80 R X |
| 4,120,453 | 10/1978 | Herb et al. | 236/49 |

Primary Examiner—William E. Tapolcai, Jr.
Attorney, Agent, or Firm—J. Raymond Curtin; David J. Zobkiw

[57] ABSTRACT

In a central air conditioning system where airflow is regulated by bellows inflation which is controlled by a bleed-type thermostat, a second bleed which is controlled by a regulator is provided to insure a minimum flow for ventilation independent of cooling demand.

2 Claims, 2 Drawing Figures

MINIMUM AIRFLOW CONTROL

BACKGROUND OF THE INVENTION

The present invention relates to a control for an air distribution unit for delivering conditioned air into an area or space. More particularly, it relates to a control for maintaining the flow of conditioned air into the area at a minimum predetermined rate irrespective of the temperature requirements of the space and is an improvement over commonly assigned U.S. Pat. No. 4,120,453.

In the arrangement disclosed in U.S. Pat. No. 4,120,453, a first pressure signal is supplied to a 3-way valve from a first pressure regulator which is controlled by a bleed-type thermostat so that the first pressure signal represents the cooling demand. A second pressure signal is supplied to the 3-way valve from a second pressure regulator and represents the minimum quantity of air for adequate ventilation. The output of the 3-way valve is supplied to a bellows which coacts with cutoff plates to regulate air flow from the plenum. The output of the 3-way valve is controlled by a differential pressure valve which receives the first pressure signal from the first pressure regulator and plenum pressure to cause the 3-way valve to communicate either the first or second pressure signal to the bellows, as required.

SUMMARY OF THE INVENTION

The present invention eliminates the 3-way valve and differential pressure valve of the U.S. Pat. No. 4,120,453 device while still providing for a minimum flow for ventilation purposes. Accordingly, a second regulator is connected to the fluid line between the first regulator and the bleed-type thermostat. This arrangement produces a regulated bleed flow even when the thermostat has shut off the bleed flow in the thermostat and would ordinarily cause the bladder to inflate to thereby cut off air flow from the plenum. The regulated bleed flow from the second regulator limits the amount which the bladder can inflate and thereby establishes a minimum air flow from the plenum into the room.

It is, therefore, an object of the present invention to have an air distribution unit with suitable control means whereby a minimum predetermined flow of air into the space being conditioned is maintained irrespective of the temperature requirements in said space.

It is another object of this invention to maintain a minimum flow of conditioned air for ventilating purposes from an air distribution unit without introducing maintenance problems.

It is a further object of this invention to maintain a minimum flow of conditioned air from an air distribution unit without adversely affecting the air delivery characteristics thereof.

These and other objects of the present invention are attained in an air distribution unit for discharging conditioned air into an area to be conditioned and including means defining a plenum chamber for receiving conditioned air, means defining an outlet from the plenum chamber into the area to be conditioned, and a damper arrangement to regulate the flow of conditioned air from the plenum chamber to the outlet means. The unit includes control means including thermostatic means to vary the operation of the damper means in accordance with the sensed temperature of the air to be conditioned whereby a greater quantity of air is introduced into the area when the temperature thereof is substantially greater than a predetermined set point, with a lesser quantity of air being introduced into the area as the sensed temperature approaches the set point. The control means further includes override means operable when the damper means substantially terminates the flow of air into the area being conditioned in response to said thermostatic means to maintain a minimum flow of conditioned air from the plenum chamber to the outlet means irrespective of the sensed temperature.

BRIEF DESCRIPTION OF THE DRAWING

For a fuller understanding of the present invention, reference should now be made to the following detailed description thereof taken in conjunction with the accompanying drawings wherein.

DESCRIPTION OF THE PREFERRED EMBODIMENT

Figure 1:
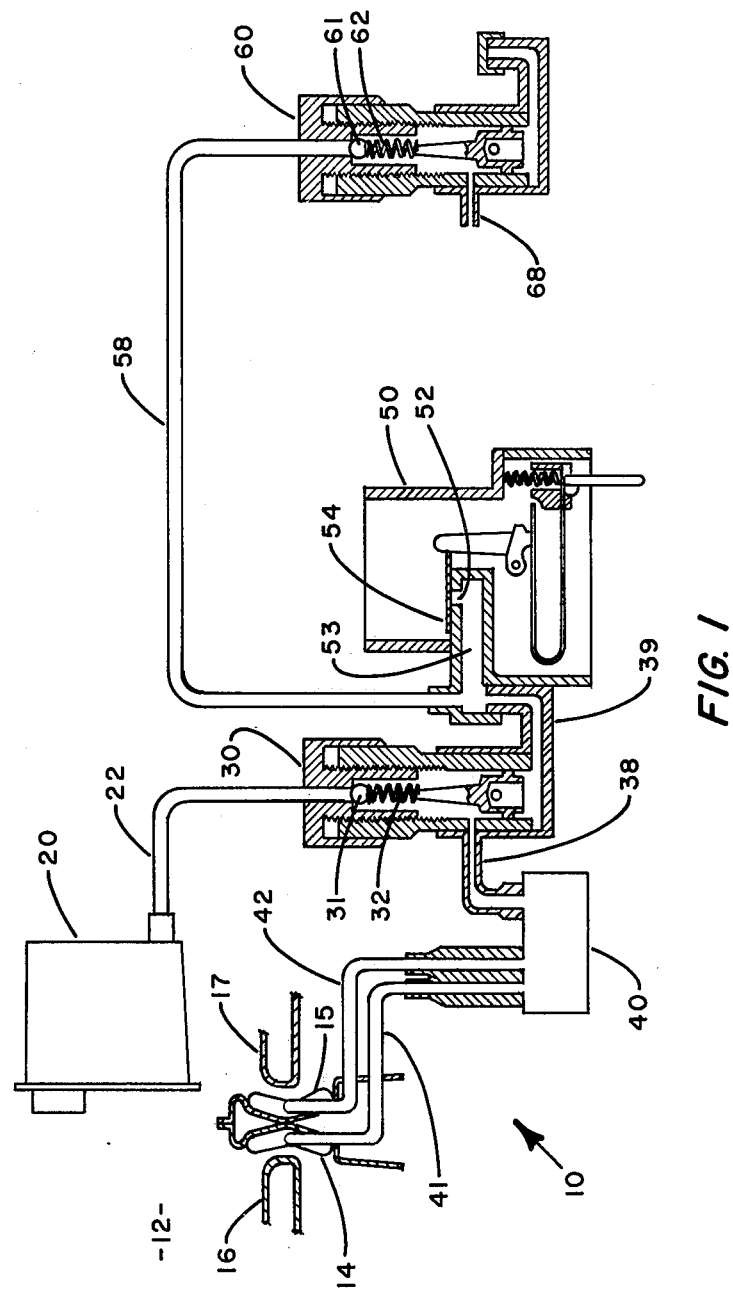
FIG. 1 is a schematic representation of a central air conditioning system employing the present invention.

Referring to FIG. 1, there is illustrated a preferred embodiment of an air distribution unit 10 in accordance with the present invention. Conditioned air is delivered from a central source thereof (not illustrated) to a plenum chamber 12 of the air distribution unit. A damper arrangement illustrated as inflatable bellows 14 and 15 regulates the flow of conditioned air from the plenum 12 to the area or space being conditioned. A portion of the conditioned air furnished to plenum chamber 12 flows to filter 20 where any foreign bodies entrained therein will be removed. The conditioned air passing through filter 20 is used for controlling the operation of unit 10. The control air passes from filter 20 to first pressure regulator 30 via line 22. The control air passes from regulator 30 into distributor 40 via line 38 and from distributor 40 via lines 41 and 42 to bellows 14 and 15, respectively. Additionally, control air passes via line 39 to bleed-type thermostat 50 which senses the temperature of the area to be conditioned and in response thereto controls the magnitude of the control signal supplied to bellows 14 and 15 by bleeding control air through bleed port 52.

A second pressure regulator, the minimum airflow regulator, 60 is connected upstream of bleed port 52 via line 58. Except for ordinarily being set to open at a different pressure and having different fluid connections, regulators 30 and 60 are otherwise preferably identical.

The damper arrangement employed to control the flow of conditioned air from the plenum 12 further includes aligned cutoff plates 16 and 17 which are provided with a curved surface for coacting with inflatable bellows 14 and 15. By varying the inflation of the bellows, the area between each of the bellows and the cutoff plates may be varied to regulate the quantity of conditioned air discharged into the area or space being conditioned. The manner in which inflation of the bellows is controlled shall be explained in detail hereinafter.

OPERATION OF THE PREFERRED EMBODIMENT

The operation of the air distribution unit and the control system related thereto shall now be more fully explained.

The adjustment of the tension of springs 32 and 62 of regulators 30 and 60 respectively, will ordinarily be factory set and will be determinative of the seating bias of ball valves 31 and 61, respectively, with spring 62 providing a greater biasing force than spring 32. Alternatively, the regulators 30 and 60 can be set upon installation since they will not be readily accessible. Thermostat 50 will be set at an adjustable set point.

Assuming that the area to be cooled is at a temperature substantially above the set point, pressurized control air will serially pass through the filter 20 and line 22 to pressure regulator 30 where it will cause ball valve 31 to open against the bias of spring 32. Pressure inside regulator 30 is communicated via line 38 to distributor 40 thence via line 41 to bellows 14 and via line 42 to bellows 15. The bellows 14 and 15 will be inflated to a degree dictated by the pressure in regulator 30 and the degree of inflation of the bellows 14 and 15 will dictate the amount of conditioned air that will be able to pass from the plenum 12 between the bellows 14 and 15 and their respective cutoff plates 16 and 17 into the space to be cooled. The pressure regulator 30 is in fluid communication with chamber 53 of thermostat 50. The pressure in chamber 53 and hence the pressure in regulator 30 and bellows 14 and 15 is controlled by apertured sliding plate 54 which controls the amount of air bled from chamber 53 via bleed port 52. As the temperature in the area to be cooled approaches the set point, flow from chamber 53 via bleed port 52 will be throttled which raises the pressure in chamber 53, regulator 30 and hence bellows 14 and 15 to reduce the flow of conditioned air into the space to be cooled. The pressure in chamber 53 will also be communicated via line 58 to regulator 60 but will be insufficient to unseat ball 61 against the bias of spring 62. As the pressure in chamber 53 continued to rise, bellows 14 and 15 continue to inflate until the pressure is sufficient to overcome the bias of spring 62 whereby the pressure in regulator 30, chamber 53 and bellows 14 and 15 is controlled by the bleed flow through regulator 60 to the atmosphere via line 68.

Figure 2:
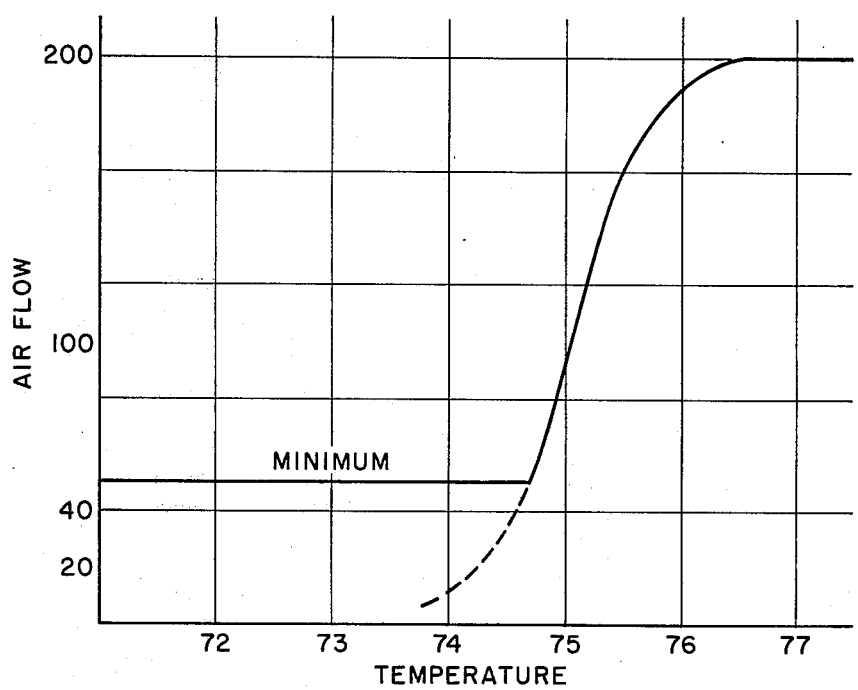
FIG. 2 is a graph showing a typical operating sequence.

The point at which regulator 60 opens defines the minimum air flow through the unit 10 and corresponds to the horizontal portion of the curve in FIG. 2. If thermostat 50 were the only means of regulating the bleed flow, then air flow would follow the dashed portion of the curve.

Although a preferred embodiment of the present invention has been illustrated and described, other changes will occur to those skilled in the art. It is therefore intended that the present invention is to be limited only by the scope of the appended claims.

We claim:

1. A minimum airflow control for an air distribution unit comprising:
   bellows controlled damper means for controlling the flow of conditioned air into an area;
   first regulator means opening at a first pressure to supply control air to said bellows to cause said bellows to inflate in accordance with the pressure of said control air;
   thermostatic means for controlling the pressure of said control air supplied to said bellows by said first regulator means over a first pressure range by bleeding said control air to atmosphere in response to the setting of said thermostatic means to thereby control the inflation of said bellows; and
   second regulator means opening at a second pressure which is higher than said first pressure for controlling the pressure of said control air supplied to said bellows by said first regulator means over a second pressure range by bleeding said control air to atmosphere whereby said bellows are inflated so as to provide a minimum flow of conditioned air independent of said thermostatic means.

2. The minimum airflow control of claim 1 wherein said second regulator means is fluidly connected to said first regulator means so as to bypass said thermostatic means.

* * * * *